May 19, 1959 — H. A. COTESWORTH — 2,887,068
OVERHEAD MONORAIL SYSTEM AND TRACK SWITCH THEREFOR
Filed Feb. 27, 1956 — 2 Sheets-Sheet 1
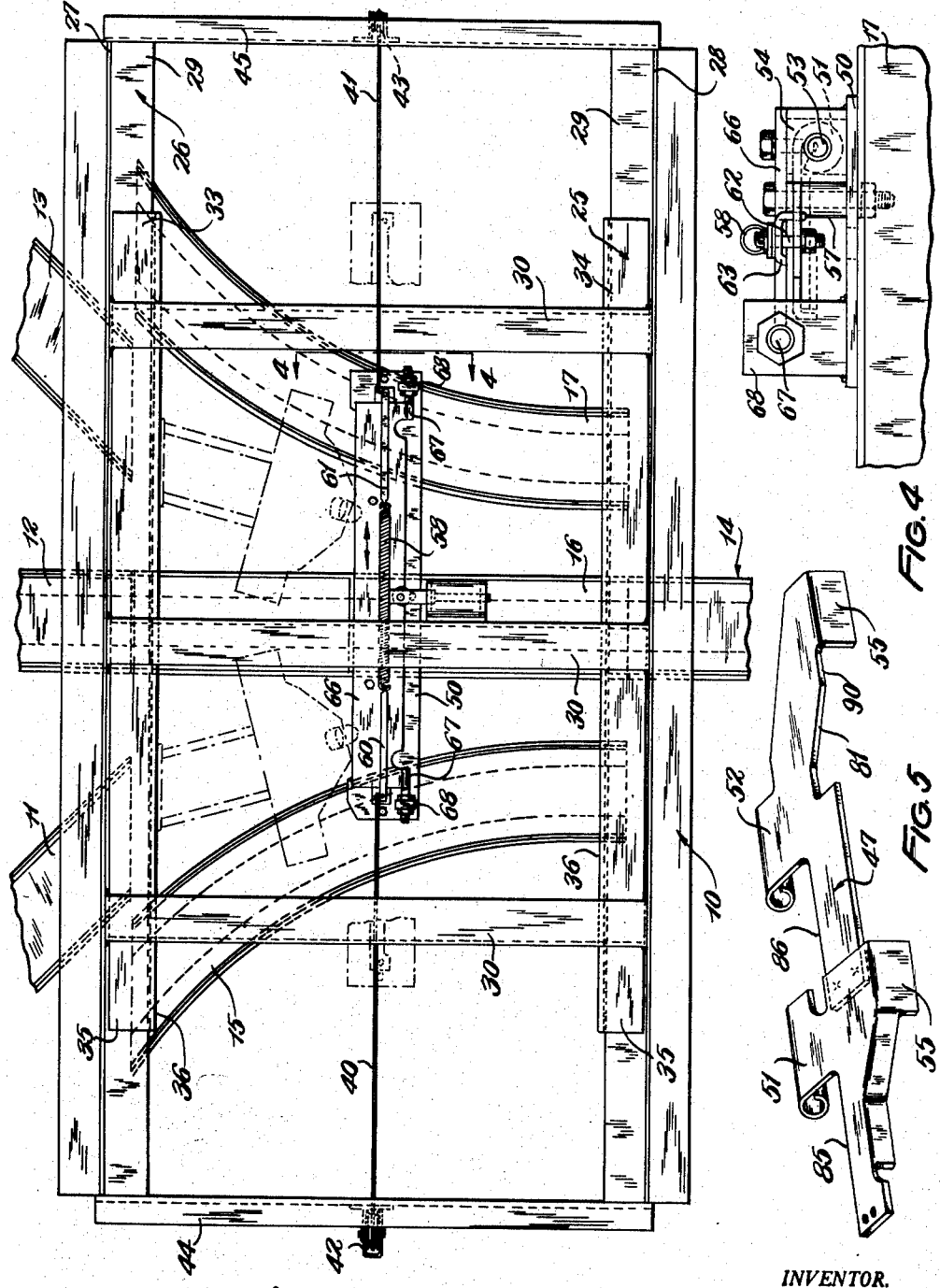
INVENTOR.
HARRY A. COTESWORTH
BY
ATTORNEYS

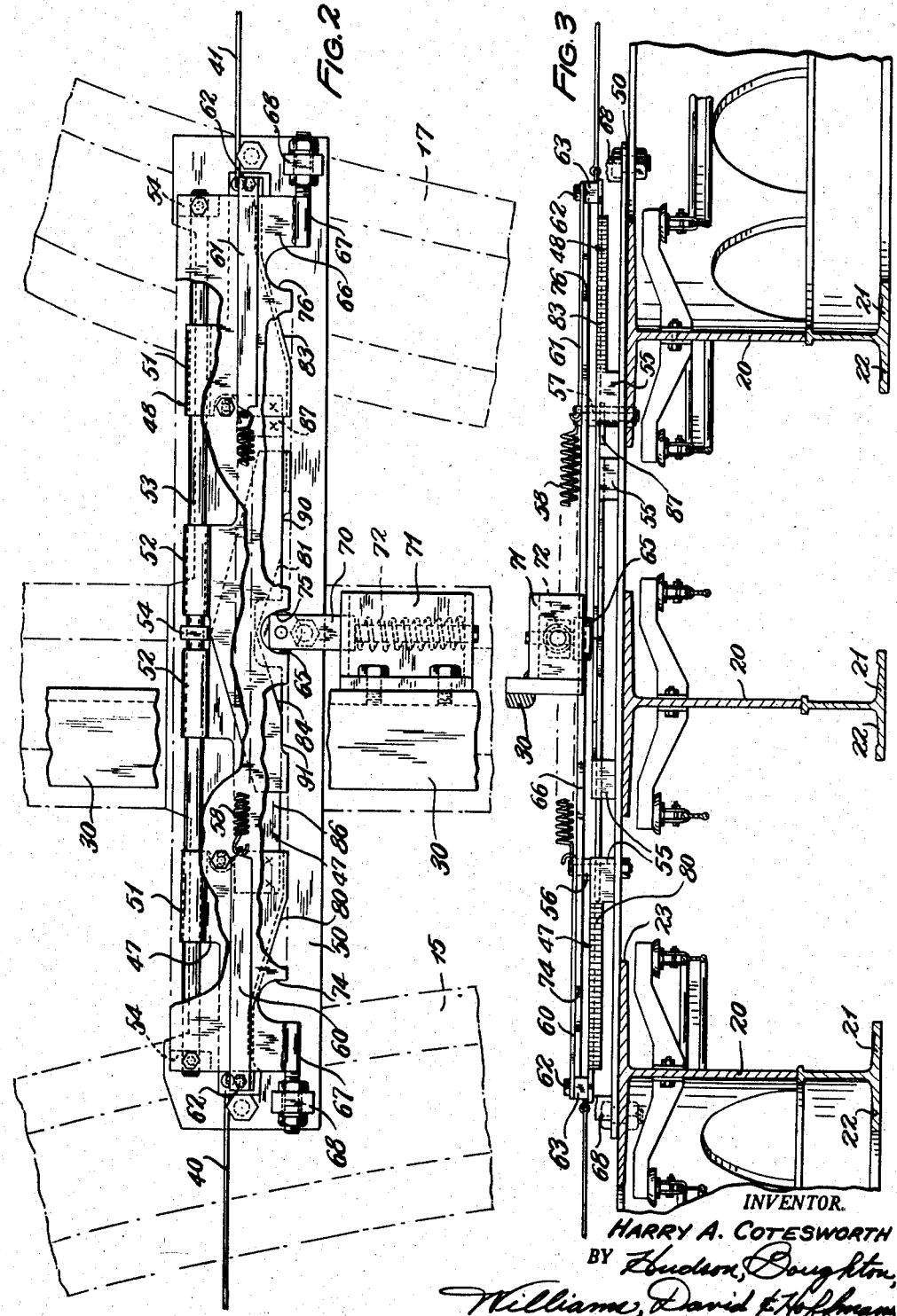

United States Patent Office

2,887,068
Patented May 19, 1959

2,887,068

OVERHEAD MONORAIL SYSTEM AND TRACK SWITCH THEREFOR

Harry A. Cotesworth, Cleveland Heights, Ohio, assignor to The Cleveland Crane & Engineering Company, Wickliffe, Ohio, a corporation of Ohio Application February 27, 1956, Serial No. 567,956

6 Claims. (Cl. 104—102)

The present invention relates to overhead monorail carrier systems and, more particularly, to such a system having a track switch therein for selectively causing a carrier traveling on a trackway entering the switch to take any one of a plurality of exit trackways leading from the switch.

The principal object of the present invention is to provide a new and improved overhead monorail system having a track switch shiftable to at least three operative positions, including two end positions and an intermediate position, for determining which one of at least three trackways leading from the switch that a carrier, traveling on an entering trackway to the switch, will take, the track switch including releasable latching means for securely holding the track switch in the desired operative position, and being so constructed and arranged that while a force is applied to shift the track switch in one direction, the latching means is released and prevented from reengaging to stop the track switch in the end position away from which it is being shifted or in the intermediate position, whereby the switch may be selectively shifted from one of its end positions through an intermediate position to the other of its end positions without the latching means engaging to stop the track switch in its intermediate position.

Another object of the present invention is the provision of a new and improved track switch for use in an overhead monorail system and having a movable frame which is shiftable in an endwise direction between an intermediate position and end positions on opposite sides of the intermediate position to selectively align a continuous trackway between an entering trackway to the switch with any one of three exit trackways, the movable frame carrying a member having a surface adapted to be engaged by a spring-biased roller supported adjacent to the member and receivable in recesses in the surface of the member engaged thereby when the track switch is in any one of its three operative positions, the track switch being so constructed and arranged that the inner frame is shifted by means of force transmitting members, such as cables which initially, when operated to move the frame in one direction, actuate cam members to release the spring-biased roller from the recess in which it is engaged and prevent the roller from engaging in the recess for the intermediate position, unless the force applied to the force transmitting members to shift the frame is released, thereby enabling the frame to be selectively shifted through the intermediate position when traveling from one of the end positions of the frame to the other end position.

The invention resides in certain constructions, combinations and arrangements of parts, and further objects and advantages will be apparent to those skilled in the art to which it relates from the following description of the preferred embodiment described with reference to the accompanying drawings forming a part of this specification in which:

Fig. 1 is a fragmentary plan view of an overhead monorail system embodying the present invention and showing one of the track switches therein;

Fig. 2 is an enlarged plan view of a portion of the track switch shown in Fig. 1 with parts thereof cut away;

Fig. 3 is a front elevational view of the track switch shown in Fig. 1;

Fig. 4 is a fragmentary end view of a portion of the track switch shown in Fig. 2; and Fig. 5 is a detail view of a cam member used with the track switch of Fig. 1.

In the overhead monorail system shown in the drawings, a track switch 10 may be shifted to any one of three operative positions to determine which one of three exit trackways 11, 12, 13, leading from the track switch 10 that an overhead monorail carrier, traveling on an entering trackway 14 to the switch, will take. The exit trackways 11, 12, 13 terminate short of the trackway 14, and the track switch 10 includes three overhead monorail sections 15, 16, 17, each of which may be selectively aligned, with the entering trackway 14 and a respective one of the exit trackways 11, 12, 13, to provide a continuous path between the entering trackway and one of the exit trackways. In the illustrated embodiment, the exit trackway 12 is aligned with the entering trackway 14, and the rail section 16 for interconnecting the trackways 12, 14 is positioned intermediate the rails 15, 17 for interconnecting the trackway 14 with exit trackways 11, 13, respectively. The exit trackways 11, 13 diverge from the entering trackway 14 at an angle of approximately 45 degrees, and the sections 15, 17 are curved correspondingly to provide a continuous path for a carrier traveling from the entering trackway 14 to the selected exit trackway.

The trackways 11—14 and the rail sections 15—17 are of conventional monorail construction and will not, therefore, be described in detail. Suffice it to say, that each includes a rail member having a web 20 terminating at its lower edge in horizontal flange portions 21, 22 extending from the opposite sides of the web for supporting the wheels of the overhead monorail carrier and at its upper edge in horizontal flange portions 23.

The rail sections 15, 16, 17 constitute part of an inner frame assembly 25 which is supported for endwise shifting movement by an outer frame assembly 26 to permit the various rail sections 15—17 to be shifted to a position in alignment with the entering trackway 14. The outer frame assembly is supported in any conventional manner above the trackways 11—14 and comprises spaced horizontal inverted T-shaped members 27, 28 extending transversely of the trackways 12—14 and having lower inwardly extending horizontal flange portions 29 for supporting the inner frame assembly 25. Three spaced transverse frame members 30 are connected between the upper edges of the T-shaped members 27, 28 to provide a rigid outer frame assembly.

In addition to the rail sections 15—17, the inner frame assembly comprises L-shaped members 33, 34 parallel and adjacent to the T-shaped members 27, 28, respectively, and each having a horizontal portion 35 overlying the adjacent flange portion 29 of the T-shaped members 27, 28 and a depending vertical leg portion 36 welded, or otherwise secured, to the upper flange portions 23 of the rail sections 15, 16, 17. Any suitable antifriction means may be provided between the horizontal portions 35 of the members 33, 34 and the adjacent horizontal flange portions 29 of the T-shaped members 27, 28 to support the inner frame assembly on the outer frame assembly and facilitate the shifting of the inner frame assembly 25.

The inner frame assembly 25 is moved with respect to the outer frame assembly 26 by means of force transmitting or pull members, such as pull chains or cables 40, 41, each of which passes over a respective sheave respectively mounted on end plates 44, 45 bridging the opposite ends, respectively, of the members 27, 28. In the preferred and illustrated embodiment, the pull cable 40 is operable to shift the inner frame assembly 25 to the left, as viewed in the drawings, and the pull cable 41 is operable to shift the inner frame assembly to the right. The pull cables 40, 41 are, respectively, connected to cam members 47, 48, supported for limited movement with respect to the rest of the inner frame assembly 25.

A plate member 50 extends between the upper sides of the rail sections 15—17 at approximately the midpoint of their length and is secured by bolts, or other suitable means, to the upper flange portions 23 of the rail sections. The cam members 47, 48 each have extending from one of the longitudinal edges thereof aligned bosses 51, 52 with axial openings therethrough for receiving and passing a guide rod 53 connected to the plate member 50 at its opposite ends and at its midpoint by blocks 54. The bosses 51, 52 are formed by properly bending the plate forming the cam members and support the respective cam members for sliding movement with respect to the rod 53 and the plate member 50, the bosses of the cam member 47 sliding on the left-hand portion of the rod 53, and the bosses of the cam member 48 sliding on the right-hand portion of the rod 53. The edges of the cam members 47, 48 opposite to the bosses 51, 52 have foot portions 55 depending therefrom to ride on the plate 50.

The cam members 47, 48 are urged towards each other and against vertical sleeves 56, 57, respectively, forming stop members for the respective cam members, by a spring 58 connected between the cam members. The spring 58 extends parallel to the rod 53 and has its opposite ends respectively connected to links 60, 61 which are connected to the outer ends of the cam members 47, 48, respectively, by bolts 62 and U-shaped brackets 63. The U-shaped brackets 63 space the links 60, 61 from the outer ends of the cam members 47, 48 for reasons which will appear hereinafter.

When a force is applied to the pull cable 40, the spring 58 yields to permit the cam member 47 to move to the left on the rod 53 until the inner end thereof engages the block 54 at the left-hand end of the rod, or until the tension in the spring 58 is sufficient to overcome the friction between the inner frame assembly 25 and the outer frame assembly 26 to cause movement of the inner frame assembly to the left. It will be noted that a force applied to the pull cable 40 is exerted through the spring 58, the link 61, the cam member 48 and the sleeve 57 engaged by the cam member 48 to move the frame to the left and is only prevented from so doing by the frictional force between the inner frame assembly and the outer frame assembly. Preferably, the tension of the spring 58 is so related to the frictional force between the inner and the outer frame assembly that the cam member 47 engages the block 54 at the left-hand end of the rod 53 before the inner frame assembly starts its movement.

When a force is applied to the pull cable 41, the cam member 48 is moved to the right against the action of the spring 58, and a force tending to move the inner frame assembly 25 to the right is applied to the inner frame assembly through spring 58, the link 60, the cam member 47, and the stop or sleeve 56 engaged by the cam member 47 and through the block 54 at the right-hand end of rod 15 when the block is engaged by the cam member.

A latching member or roller 65 is mounted on the outer frame assembly 26 and is adapted to cooperate with a latch plate 66 carried by the inner frame assembly to lock the inner frame assembly when it is in any of its three operative positions wherein one of the rail sections carried thereby is in alignment with the entering trackway 14. The latch plate 66 is a substantially horizontal plate positioned intermediate the links 60, 61 and the cam members 47, 48 and resting on the top of the blocks 54. The latch plate 66 is bolted adjacent one longitudinal edge thereof to the blocks 54. The opposite longitudinal edge of the plate 66 has welded thereto, at its opposite ends, rods 67. The rods 67 extend outwardly of the adjacent end of the plate 66 and through apertures in respective ears 68 mounted on the plate member 50 and extending upwardly therefrom. The rods 67 are threaded, and nuts on either side of the ears 68 form an adjustable clamp connection between the rods 67 and their respective ears 68. The bolts for fastening the latch plate 66 to the blocks 54 preferably pass through elongated holes, not shown, to permit endwise adjustment of the latch plate 66.

The roller 65 is supported from the central transverse frame member 30 of the outer frame assembly so as to ride on the longitudinal edge of the latch plate 66 adjacent to the rods 67. The roller 65 is carried by an axially movable plunger 70 slidably mounted in a housing 71 and urged outwardly with respect thereto by a spring 72 within the housing 71. The housing 71 is bolted to the central transverse frame member of the outer frame assembly.

The edge of the latch plate 66, against which the spring-biased roller 65 rides, has three longitudinally spaced recesses 74, 75, 76 each adapted to receive the roller 65. The recesses 74, 75, 76 are so spaced that when the rail sections 15, 16, 17 are respectively aligned with the entering trackway 14, the recesses 74, 75, 76 are respectively engaged by the roller 65 to latch the track switch with the desired rail section in alignment with the entering trackway 14. Thus, when the inner frame assembly has been shifted to align the rail 15 with the entering trackway 14, the roller 65 is received in the recess 74 and the inner frame assembly is in one of its end positions, when the inner frame assembly is positioned to align rail section 16 with the entering trackway 14, the roller 65 is received in the recess 75 and the inner frame assembly is latched in its intermediate position, and when the track switch has been shifted to the left, as viewed in the drawings to align the rail section 17 with the entering trackway 14, the roller 65 is received in the recess 76 and the inner frame assembly is latched in its other end position.

When the track switch is to be shifted from its intermediate position with one of the rail sections in alignment with the trackway 14 to a position with another of its rail sections in alignment with the entering trackway and a force is applied to one of the pull cables 40 or 41 to shift the inner frame assembly 25, the initial limited movement of either the cam member 47 or the cam member 48, as the case may be, causes a cam surface to engage the roller 65 and move it outwardly of the recess in which it is positioned to disengage the roller to permit the shifting of the inner frame assembly. To this end, the edge of the cam member 47 adjacent to the recesses 74, 75 has a depending portion which forms a cam surface 80 for disengaging the roller 65 from the recess 74, and an edge portion which forms a cam surface 81 for disengaging the roller 65 from the recess 75. The cam surfaces 80, 81 are positioned to the right of the recesses 74, 75 when the cam member 47 is in its innermost position and when the latter is moved to the left, as viewed in the drawings, from its innermost position, as when a force is applied to the pull cable 40 to shift the inner frame assembly to the left, the cam surfaces 80, 81 move across the recesses 74, 75 to disengage the roller 65 if the latter is positioned therein. The cam surface 80 and the cam surface 81 are straight line surfaces which extend, when the cam member 47 is in its innermost position, tangentially from the bottom portions of the recesses 74, 75, respectively, to the right toward the edge of the latch plate 50 into which the recesses 74, 75, 76 open.

The cam member 48 is similar to the cam member 47 but is of opposite hand. The cam member 48 has straight line surfaces 83, 84 for disengaging the roller 65 from the recesses 76, 75, respectively, when the cam member 48 is moved to the right by a force applied to the pull cable 41. The cam surfaces 83, 84 correspond to the cam surfaces 80, 81 of the cam member 47 but are of opposite hand and, when the cam member 48 is in its innermost position, extend tangentially from the bottom of the recesses 76, 75, respectively, to the left, as viewed in Fig. 2, toward the edge of the latch plate into which the recesses 75, 76 open.

For purposes of clarity, the cam member 47 is shown in detail in Fig. 5. It will be noted that the cam member is formed of two welded plate portions 85, 86, one of which is formed to provide the boss 51 and the cam surface 80, and the other of which is formed to provide the boss 52 and the cam surface 81. The plate portion 86 is welded to the underside of the plate portion 85 to form an extension thereof and to make the cam member 47 a single member. Welding the plate portion 86 to the underside of plate portion 85 also provides an offset portion in the cam member 47.

The cam member 48 is constructed in a manner similar to the cam member 47 and comprises two parts welded together, one part carrying the boss 52 of the cam member 48 and the cam surface 84, and the other part carrying the boss 51 of the cam member and the cam surface 83. The parts of the cam member 48, however, are welded in abutting relationship rather than in an offset relationship and are reinforced by a block 87. By welding the parts of the cam member 48 together in abutting relationship, the portion of the cam member carrying the cam surface 84 and the boss 52 thereof will operate immediately above the plate portion 86 of the cam member 47.

The straight-line cam surfaces 81, 84, of the cam members 47, 48 for disengaging the roller 65 from the recess 75, terminate adjacent the longitudinal edge of the cam members 47, 48, respectively, in flat portions 90, 91, respectively. The relationship of the straight-line cam surfaces 81, 84 to the flats 90, 91, respectively, is such that when the respective cam member is in its most outward position illustrated in dot-dash lines in Fig. 1, with respect to the remainder of the inner frame assembly, the respective flat forms a bridge across the recess 75 on which the roller 65 will roll, the corresponding straight-line cam surface 81, 84 being shifted to the opposite side of the recess 75 from its normal position. By preventing the roller 65 from dropping into the recess 75 when either of the cam members 47, 48 are in their outermost positions, the inner frame assembly 25 can be shifted from either end position through its intermediate position to the other end position without latching in its intermediate position. If the operator shifting the inner frame assembly desires to latch the inner frame assembly in its intermediate position to align the rail section 16 with the entering trackway 14, and he is shifting the inner frame assembly from its extreme right-hand position by applying a force to the pull cable 40, he merely releases the force being exerted on the pull cable 40 when the inner frame assembly approaches its intermediate position. This will permit the cam member 47 to move to its inner position under the action of the spring 58 thereby moving the flat 90 from its bridging position across the recess 75 and permitting the roller 65 to drop into the recess 25 as the inner frame assembly 75 coasts to its intermediate position. If the inner frame assembly is in its intermediate position, operation of either of the pull members 40, 41 will release the roller 65 from the recess 75 and permit shifting of the inner frame assembly.

The track switch is so constructed and arranged that the forces exerted by the flexible members 40, 41 on the inner frame assembly 25 are parallel to the direction of movement of the inner frame assembly and, therefore, the full component of the force applied to the pull members is effective to urge the inner frame assembly in the direction of shifting movement and is positively applied to the frame assembly when the cam members 47, 48 engage the blocks 54 upon completion of their latch-releasing movement. It will be noted that in the illustrated embodiment, the cam members 47, 48 are supported for limited movement parallel to the direction of movement of the inner frame assembly and, therefore, the full component of the forces exerted by the flexible members 40, 41 acts to urge the cam members in their latch-releasing direction. A track switch constructed as described will shift easily without danger of fouling the flexible pull members.

While the cam members 47, 48 have been shown and described as, and preferably are, separate individually movable cam members, they could be connected to move as a unit in which case the force on the pull member would have to be released when the inner assembly is being shifted before the roller would engage the recess corresponding to the end position, as well as the intermediate position to which the inner frame assembly is being moved.

It can now be seen that the objects heretofore enumerated and others have been accomplished and that the present invention provides a new and improved overhead monorail system having in combination therewith a novel track switch for dispatching a carrier over a selected one of a plurality of trackways exiting from the switch, the track switch being so constructed and arranged that it is readily shiftable between three operative positions without danger of fouling the operating lines therefor and so that it may be readily shifted from either of two end positions to the other end position through an intermediate position without stopping in the intermediate position. The latching means for holding the track switch in its selected operative position is readily releasable and permits the shifting of the track switch in the manner mentioned above.

While a preferred form of the invention has been described in considerable detail, it will be apparent that the invention is not limited to the constructions shown or the uses referred to and it is my intention to cover hereby all adaptations, modifications, and changes which come within the practice of those skilled in the art to which the invention relates and the scope of the appended claims.

Having thus described my invention, I claim:

1. In an overhead monorail carrier, a track switch comprising a first frame, a second frame supporting said first frame for horizontal movement transversely of an entering trackway leading into the switch to any of a plurality of operative positions including first and second end positions and an intermediate third position for selectively registering in one direction of carrier travel the entering trackway with different ones of a plurality of exit trackways leading from the switch, latching means including a movable latch member supported by one of said frames and engageable to prevent movement of the first frame, means on the other of said frames defining at least three spaced abutment means for receiving and engaging said latch member to prevent movement of said first frame, said abutment means being spaced along the line of movement of said first frame and each of said abutment means corresponding to a respective one of said operative positions and receiving said latch member when said first frame is in the respective one of said positions, means for urging said latch member toward engagement with said abutment means, a first cam member having first and second cam surfaces for disengaging said latch member from the abutment means corresponding to said intermediate position of said first frame and the abutment means corresponding to one of said end positions respectively, means movably supporting said first cam member on one of said frames for movement to and for movement from an operative position wherein the cam surfaces thereof are disposed to prevent the engagement of said latch member with the corresponding abutment means and to release the latch member when engaged therewith, a second cam member having first and second cam surfaces for disengaging said latch member from the abutment means corresponding to said intermediate position of said first frame and the abutment means corresponding to the other of said end positions respectively and for preventing the engagement of said latch member therewith, means movably supporting said second cam member on one of said frames for movement to and movement from an operative position wherein the cam surfaces thereof are disposed to prevent the engagement of said latch member with the corresponding abutment means, spring means operatively connected with said cam members for yieldably urging said cam members away from their said operative positions, first and second force transmitting members connected to said first frame for respectively shifting said first frame in opposite directions, means connecting said first force transmitting member to the one of said cam members which is movable to disengage the latch member from the pair of abutments corresponding to the end position away from which the force transmitting member is operative to shift the first frame to move the cam member to its said operative position upon application of a force thereto to shift the first frame, and means connecting the other of said force transmitting members to the other of said cam members to move the latter to its said position upon operation of the force transmitting member to shift the first frame.

2. An overhead monorail carrier having in combination therewith a track switch comprising a first frame, a second frame supporting said first frame for horizontal shifting movement transversely of an entering trackway leading into the switch to any of a plurality of operative positions including two end positions and an intermediate position for selectively registering in one direction of carrier travel the entering trackway with different ones of a plurality of exit trackways leading from the switch, latching means comprising a reciprocable spring-biased latch member supported adjacent to said first frame for preventing movement of the first frame means on said first frame defining at least three spaced abutment means for receiving said latch member, said abutment means being spaced along the line of movement of said first frame and each of said abutment means corresponding to a respective one of said operative positions and receiving said latch member when said first frame is in the respective one of said positions, a first cam member having first and second cam surfaces for disengaging said latch member from the abutment means corresponding to the said intermediate position of said first frame and the abutment means corresponding to one of said end positions respectively, means supporting said first cam member on said first frame for movement to and for movement from a position wherein the cam surfaces thereof are disposed to engage the latching means to release the latch member from and prevent the engagement of said latch member with the corresponding abutment means, a second cam member having first and second cam surfaces for disengaging said latch member from the abutment means corresponding to the said intermediate position of said first frame and the abutment means corresponding to the other of said end positions respectively, means movably supporting said second cam member on said first frame for movement to and for movement from a position wherein the cam surfaces thereof are disposed to engage the latching means to release the latch member and prevent engagement of said latch member with the corresponding abutment means, spring means for yieldably opposing movement of said cam members to release the latch member, first and second force transmitting members operatively connected to said first frame for respectively shifting said first frame in first and second respective directions to shift said first frame between said positions, means connecting said first force transmitting member to the one of said cam members which is movable to disengage the latch member from the pair of abutments corresponding to the end position away from which the force transmitting member is operative to shift the first frame to move the cam member to release said latch member upon application of a force thereto to shift the first frame, means connecting the other of said force transmitting members to the other of said cam members to move the latter to release said latch member upon operation of the force transmitting member to shift the first frame, and first and second stop means on said first frame engageable by said first and second cam members respectively to limit the movement of the cam member in their latch releasing direction.

3. A track switch for selectively connecting any one of at least three laterally spaced exit trackways leading from the track switch with another trackway entering the switch, said track switch comprising a first frame, a second frame supporting said first frame for horizontal shifting movement transversely of the entering trackway to any one of a plurality of operative positions including two end positions and an intermediate position in each of which positions the entering trackway is registered with a respective one of said exit trackways, a recessed member having a side extending parallel to the line of shifting movement of said first frame, means fixedly connecting said recessed member to said first frame, latching means comprising a latch member adapted to ride against said side, means supporting said latch member adjacent to said side and yieldably urging said latch member into engagement with said side, said side having a plurality of spaced recesses therein for receiving said latch member, each of said recesses corresponding to a respective one of said operative positions and said latch member being received therein when said first frame is in the respective operative position to prevent movement therefrom, first and second force transmitting members operatively connected to said first frame for shifting said first frame in respective directions opposite to each other, a first cam member having cam surfaces for engaging the latching means and disengaging the latch member from and preventing the engagement of the latch member with the respective recesses corresponding to the intermediate position and one of said end positions, a second cam member having cam surfaces for engaging the latching means and disengaging the latch member from and preventing the engagement of the latch member with respective recesses corresponding to the intermediate position and the other of said end positions, means supporting each of said cam members on said first frame for limited sliding movement with respect thereto to move the cam surfaces thereof to an operative position for engaging the latching means to disengage the latch member from and prevent the engagement of the latch member with the respective recesses, spring means for urging said cam members away from their said operative positions, and means connecting said first and second force transmitting members to a respective one of said cam members to actuate the latter to their said operative positions upon operation of the corresponding force transmitting member to shift the frame.

4. An overhead monorail carrier system having in combination therewith a track switch comprising a first frame, a second frame supporting said first frame for shifting movement transversely of an entering trackway leading into the switch to position the first frame in any of a plurality of operative positions including first and second end positions and an intermediate position for selectively registering in one direction of carrier travel the entering trackway with different ones of a plurality of exit trackways leading from the switch, latching means including a latch member movably supported by one of said frames and engageable to prevent movement of said first frame, means on the other of said frames defining a plurality of spaced abutment means for receiving said latch member to prevent movement of said first frame, said abutment means being spaced in the direction of movement of said first frame and each of said abutment means receiving said latch member when said first frame is in a respective one of said operative positions, means yieldably urging said latch member toward engagement with said abutment means, force transmitting means operatively connected to said first frame for shifting said first frame between said positions, cam means movably supported on one of said frames for movement in either of two directions from an inactive position, means yieldably urging said cam means to said inactive position, said cam means having cam surfaces disposed to engage said latching means upon movement of said cam means in one direction from said inactive position to release said latch member from and prevent the engagement of said latch member with the abutment means corresponding respectively to the intermediate abutment means and the abutment means corresponding to one of said end positions and upon movement in the other direction from said first inactive position to release the latch member from and prevent the engagement of the latch member with the abutment means corresponding to the intermediate position and the other end position of said first frame, and means operatively connecting said force transmitting means to said cam means to move the latter in one direction upon operation of the force transmitting means to shift the first frame in one direction and in the other direction upon operation of force transmitting means to shift the first frame in the other direction.

5. In an overhead monorail carrier system, a track switch comprising a first frame, a second frame supporting said first frame for movement transversely of an entering trackway leading into the switch to any one of a plurality of operative positions including first and second end positions and an intermediate position for selectively registering in one direction of carrier movement the entering trackway with different ones of a plurality of exit trackways leading from the switch, latching means on one of said frames for preventing the movement of said first frame relative to said second frame and engageable with cooperating means on the other of said frames when said first frame is in any one of its operative positions, means urging said latching means to its engaged position, first and second flexible pull members operatively connected with said first frame for applying forces to said first frame in directions substantially parallel to the line of shifting movement of said first frame for respectively moving said first frame in first and second directions along the line of shifting movement, a first cam member supported on said first frame for limited movement with respect thereto parallel to the line of movement of said first frame and having first and second cam surfaces disposed to engage the latching means to release the latching means and prevent the engagement thereof when said first frame is respectively in said first end position and said intermediate position, a second cam member supported on said first frame for limited movement parallel to the line of movement of said first frame and having first and second surfaces disposed to engage said latching means to release the latching means and prevent the engagement thereof when said first frame is respectively in said second end position and said intermediate position, means connecting said first and second pull members to said first and second cam members respectively for moving said cam members upon the application of a force to the corresponding pull member to shift said first frame to dispose said cam members to prevent engagement of said latching means, and to release the latching means when engaged, and means yieldably opposing movement of said first and second cam members to disengage said latching means.

6. A track switch for selectively connecting any one of a number of exit trackways greater than two with a trackway entering the switch, said track switch comprising a first frame, a second frame supporting said first frame for shifting movement transversely of the entering trackway to any one of a plurality of operative positions including first and second end positions and an intermediate position in each of which positions the trackway entering the switch is connected with a respective one of the exit trackways, force transmitting means operatively connected to said first frame and operable in a first direction to shift said first frame away from said first end position and in a second direction to shift said first frame away from said second end position, latching means supported by one of said frames and engageable when said first frame is in any of said operative positions to prevent movement of said first frame, first and second and third abutment means on the other of said frames for receiving said latch member when said first frame respectively is in said first end position and said intermediate position, cam means supported for movement with respect to said frames and having a first position in which a portion thereof is engageable with said latching means to prevent engagement of said latching means with the abutment means corresponding to said first end position and said intermediate position and effective to release said latching means when said first frame is in said end position or said intermediate position upon movement of said cam means to its said first position, means operatively connecting said cam means to said force transmitting means to move said cam means to its said position upon actuation of said force transmitting means in said first direction, means yieldably opposing movement of said cam means by said force transmitting means, second cam means supported for movement with respect to said frames and having a first position in which a portion thereof is disposed to engage said latching means to prevent engagement of said latching means with the abutment means corresponding to said second end position and said intermediate position respectively and effective to release said latching means when said first frame is in said second end position or said intermediate position upon movement of the second cam means to its said first position, and means operatively connecting said force transmitting means to said second cam means to actuate the latter to its said first position upon operation of said force transmitting means in its said second direction.

References Cited in the file of this patent

UNITED STATES PATENTS

| | | |
|---|---|---|
| 1,379,614 | Bennington | May 31, 1921 |
| 1,632,557 | Moon | June 14, 1927 |
| 1,678,618 | Preston | July 24, 1928 |
| 2,526,819 | Henderson | Oct. 24, 1950 |
| 2,651,714 | Poole | Sept. 8, 1953 |

FOREIGN PATENTS

| | | |
|---|---|---|
| 923,618 | France | Feb. 24, 1947 |